June 28, 1938.　　　J. H. POLLARD　　　2,122,043
METHOD OF PRODUCING CHARACTERS
Filed April 2, 1936　　　2 Sheets-Sheet 1

Inventor
John H. Pollard
By Jack Ashley
Attorney

June 28, 1938. J. H. POLLARD 2,122,043
METHOD OF PRODUCING CHARACTERS
Filed April 2, 1936    2 Sheets-Sheet 2
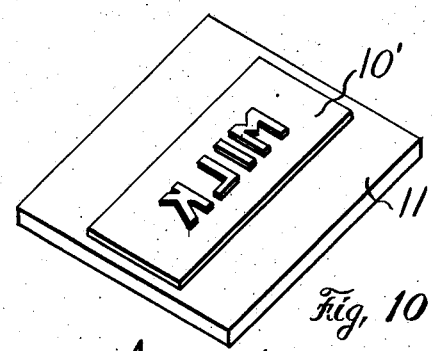
Fig. 10
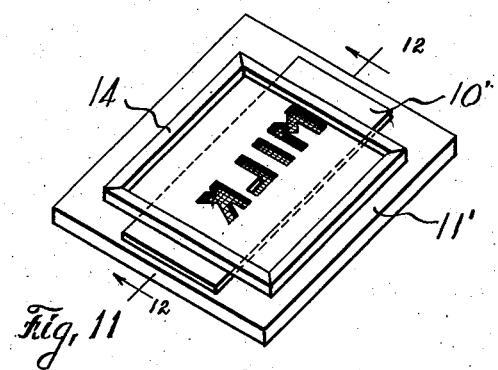
Fig. 11
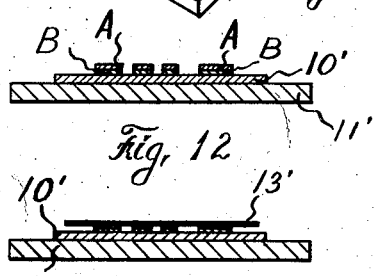
Fig. 12
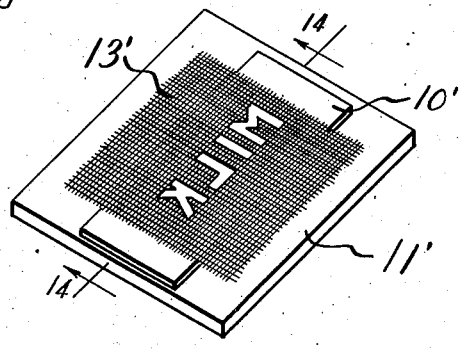
Fig. 13
Fig. 14
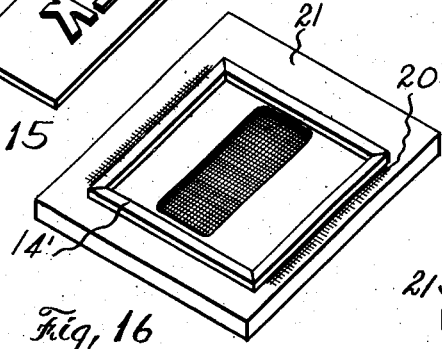
Fig. 15
Fig. 16
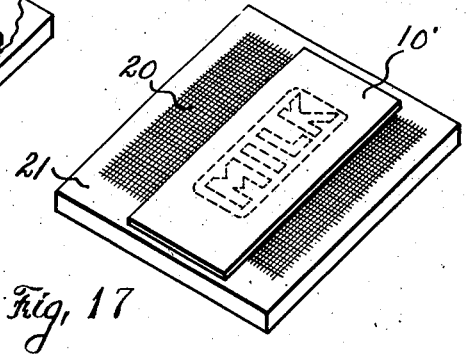
Fig. 17
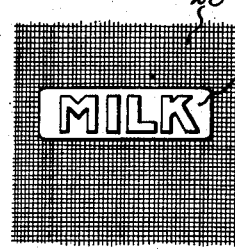
Fig. 18
Inventor
John H. Pollard
By Jack Ashley
Attorney Patented June 28, 1938

2,122,043

UNITED STATES PATENT OFFICE 2,122,043

METHOD OF PRODUCING CHARACTERS

John H. Pollard, Dallas, Tex., assignor of one-half to Arthur S. Barron and one-half to Richard Burdick, both of Dallas, Tex.

Application April 2, 1936, Serial No. 72,227

10 Claims. (Cl. 101—129)

This invention relates to new and useful improvements in methods of producing characters.

One object of the invention is to provide an improved method whereby characters, such as letters, figures, symbols, objects and the like, may be expeditiously and economically produced upon pervious or foraminous or impervious surfaces whether rough or smooth.

An important object of the invention is to provide an improved method for forming characters upon an open mesh fabric, such as is used for screens for windows or doors, which method permits the forming of fine lettering, symbols, etc., whereby details of pictures, faces, etc. may be produced.

Another object of the invention is to provide an improved method of producing characters on an open mesh fabric which involves a plastic material background having suitable characters or indicia transferred thereon through the use of an ordinary decalcomania or other transfer sheet, the plastic material serving to adhere to the fabric, whereby the characters or letters are permanently attached to said fabric.

A further object of the invention is to provide an improved method whereby suitable characters or indicia may be applied to a background of plastic material either prior to the application of said material to a wire mesh fabric, or after such application; the use of the transfer sheet permitting finer and more detailed characters and indicia.

Still another object of the invention is to provide an improved method of forming a transfer sheet by applying a plastic material to said sheet through a stencil, whereby when the sheet is applied to a background of plastic material, the indicia thereon will readily adhere thereto.

A construction designed to carry out the invention will be hereinafter described, together with other features of the invention.

Figure 1:
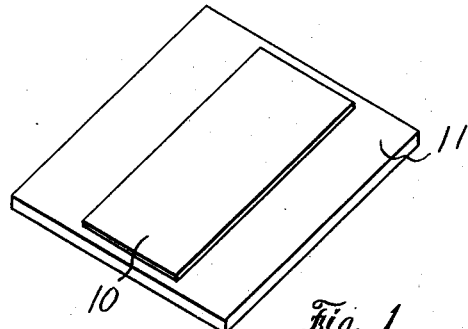
Figure 2:
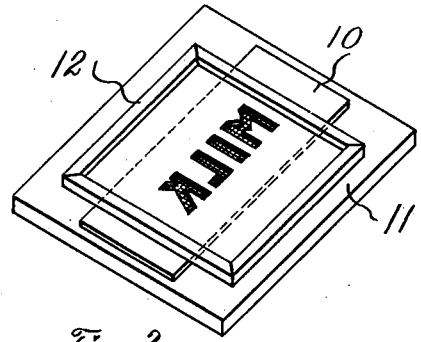
Figure 3:
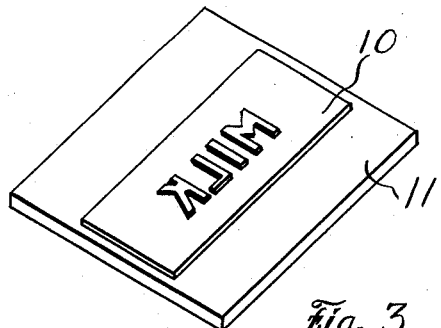
Figure 4:
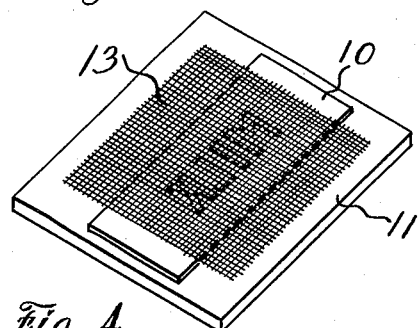
Figure 5:
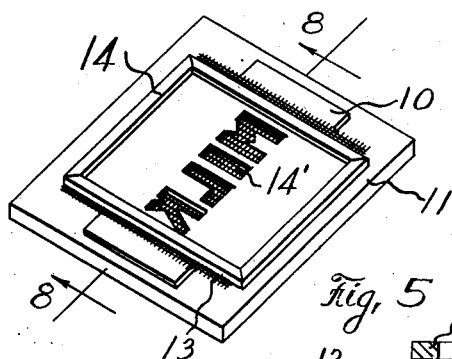
Figure 6:
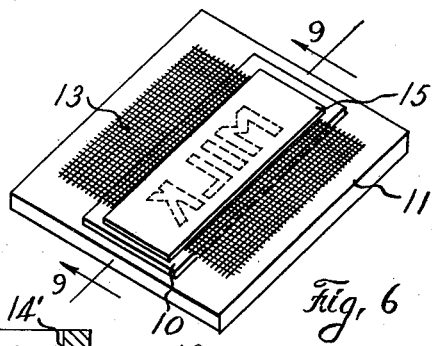
Figure 7:
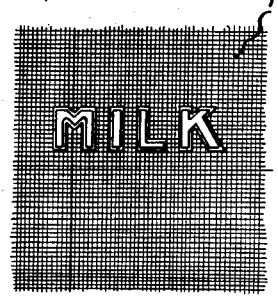
Figure 8:
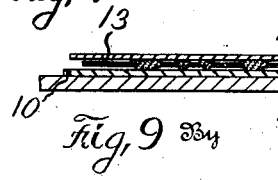
Figure 9:
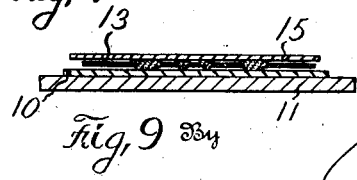

The invention will be more readily understood from a reading of the following specification and by reference to the accompanying drawings, in which an example of the invention is shown, and wherein:

Figure 1 is a perspective view showing a support having a sheet of decalcomania paper supported thereon, Figure 2 is a similar view showing a stencil positioned over the sheet for forming suitable indicia or characters in reverse on said sheet, Figure 3 is a perspective view of the completed transfer sheet, Figure 4 is a similar view, showing the wire fabric in place over the transfer sheet, Figure 5 is a view similar to Figure 4, with a stencil placed over the wire fabric, whereby a plastic compound may be passed through the wire fabric onto the indicia or characters on the transfer sheet, Figure 6 is a view similar to Figure 5, showing the tissue paper strip in place on the wire fabric with the stencil in Figure 5 removed, Figure 7 is an elevation of the wire fabric having the completed characters applied thereto, Figure 8 is a transverse, vertical sectional view taken on the line 8—8 of Figure 5, Figure 9 is a transverse, vertical sectional view taken on the line 9—9 of Figure 6, Figures 10 to 14 are views showing the successive steps in performing a method which is a modification of the invention, and Figures 15 to 18 show still another modification of the invention.

It has heretofore been the practice to produce characters on open mesh wire fabrics, such as the screens used in doors and windows, by passing paint and pigment through stencils. Due to the open mesh of the fabric, it has been impossible to obtain a clear cut or smooth letter because the pigment and paint will enter the interstices of the fabric, and also because of the uneven surface of said fabric. Therefore, the reproduction of pictures, faces, or the like was impossible. With the present method, any picture, character, symbol, object, or any other figure may be formed and reproduced on the fabric in its smallest detail.

In carrying out the improved method, a sheet of ordinary decalcomania paper 10 is placed upon a suitable table or support 11 (Figure 1). A stencil 12 which is preferably of the usual silk screen type, is then placed over the sheet 10 as is shown in Figure 2. This stencil has the character or symbol which is to be formed on the sheet cut therein. After this stencil is properly positioned, the pigment, or plastic compound, is forced through the stencil onto the sheet. The stencil 12 is then removed and a transfer sheet, as shown in Figure 3, is had. After the transfer sheet is so formed, the open mesh wire fabric 13, to which the characters are to be applied is then placed over the sheet. It is noted that during all of this time the transfer sheet 10 remains in the same position.

After the fabric 13 has been properly positioned, as shown in Figure 4, a stencil 14, which includes an open mesh material 14', is then placed on top of said fabric. A suitable plastic compound is then passed through the stencil 14 and is, of course, forced through the wire fabric 13 and onto the characters on the transfer sheet. Since this plastic material passes through the fabric 13, it will be obvious that it will adhere thereto and thus form the background of the letter. If desired, the stencil 14 may have characters which are slightly larger than the characters on the transfer sheet 10, whereby a border around the characters of the transfer sheet is produced. At the same time that the plastic material adheres to the wire mesh fabric 13, it is obvious that it is forced into the contact with the back of the characters on the transfer sheet 10, whereby the background will adhere to said letter.

After the background has been run through the stencil 14, said stencil is removed and a strip of tissue paper 15 is applied over the plastic material which has been run through the stencil. This tissue paper is for the purpose of absorbing the excess moisture from the compound.

The wire mesh fabric 13 is then removed from the table 11 and will at the same time remove the transfer sheet 10 therewith because the characters of said sheet have adhered to the plastic compound characters which have been run through the stencil 14. It is then only necessary to remove the decalcomania paper and the characters which have been formed on said paper will remain attached to the plastic compound. Thus, characters, as shown in Figure 7, will be produced on the fabric 13. It is, of course, obvious that the strip of tissue paper 15 may be removed at any desired time. From the above, it will be seen that the plastic material is applied to the wire mesh fabric and will adhere thereto. The characters on the transfer sheet 10 are, in effect, transferred to this background. Through the use of the transfer sheet the characters may be clear cut and it is obvious that any picture, face, or other detailed work may be reproduced on the mesh fabric. The plastic material which is passed through the stencil 14 provides an adhesive material whereby the characters are permanently fastened to the fabric. Also the plastic material provides a surface whereby the characters may be transferred from the transfer sheet 10.

In Figures 10 to 15, I have shown another method of carrying out the invention. In this method, a transfer sheet 10' which may be constructed as the transfer sheet 10 in Figures 1 to 9, or in any other suitable manner, is placed upon a support 11'. The screen stencil 14 is then placed over the transfer sheet 10', as is shown in Figure 11. A plastic compound or material is then passed through the screen stencil 14 so that such material A adheres to the back of the letters or characters B of the transfer sheet 10' (Figure 12). The stencil 14 is then removed and the section of the mesh wire fabric 13' to which the characters are to be applied is then placed over the transfer sheet which has the plastic material A on the back side of its characters, as is shown in Figure 13. The screen is then pressed downwardly into the plastic material A so that said material enters the interstices of said fabric (Figure 14). It is then only necessary to remove the sheet 10' and the characters on said sheet will adhere to the plastic material A, whereby said characters are formed on the fabric 13'. A display, similar to that shown in Figure 7, is thus produced. It is noted that the fabric 13' may be pressed into the plastic compound before said compound is dry. Also it might be possible to use a compound which will thoroughly dry and then by applying a chemical of a suitable nature, the plastic compound will be returned to a moist or semi-plastic state, whereby a screen may be then pressed therein. In using this latter method, that is, permitting drying of the plastic compound and then restoring it to its undried state, it is possible to apply the plastic compound at the factory, permit the same to dry and then ship the transfer sheet 10' thus formed to various points.

In Figures 15 to 18, I have shown still another modification of the invention. In this form a coarse mesh wire fabric section 20 is placed upon a suitable support 21. A screen stencil 14' is placed over the section of fabric, and this stencil has a rectangular shaped cut-out whereby when a plastic compound is passed through the stencil onto the fabric a rectangular shaped background C is formed on said fabric. It is, of course, obvious that various stencils may be employed so that any shape, square, oval or other shape, may be formed.

After the background C is formed in this manner, the transfer sheet 10', which may be formed either by the method disclosed in Figures 1 to 3 or in any other suitable manner, is then applied to the background. Thus, it will be seen that in this method a solid background is formed on the fabric 20 and suitable indicia or characters are then transferred through the use of a transfer sheet, to said background, whereby such indicia or characters are displayed on the fabric. It is noted that the background and characters may be of contrasting colors so as to add attractiveness to the display.

What I claim and desire to secure by Letters Patent, is:

1. The method of producing characters on an open mesh wire fabric which consists in, passing a plastic material through a silk screen stencil onto a sheet of decalcomania paper to form a transfer sheet, placing an open mesh wire fabric over the characters on said sheet, passing a plastic compound through a stencil, whereby said compound enters the interstices of the fabric and is applied to the characters on the transfer sheet, and then removing the sheet so that the characters thereon adhere to the plastic compound on said fabric and are displayed thereon.

2. The method of producing characters on an open mesh wire fabric which consists in, placing a transfer sheet on a support, positioning a section of open mesh wire fabric on the sheet, and then passing a plastic compound through a screen stencil through the interstices of the fabric onto the characters of the transfer sheet.

3. The method of producing characters on an open mesh wire fabric which consists in, passing a plastic material through a silk screen stencil onto a sheet of decalcomania paper to form a transfer sheet, placing an open mesh wire fabric over the characters on said sheet, passing a plastic compound through a stencil, whereby said compound enters the interstices of the fabric and is applied to the characters on the transfer sheet, placing an absorbent material over said compound to absorb the excess liquids in said compound, and then removing the sheet so that the characters thereon adhere to the plastic compound on said fabric and are displayed thereon.

4. The method of producing characters which consists in, passing a plastic compound through a screen stencil onto the characters of a transfer sheet, then pressing a section of open mesh wire fabric into the compound so that said compound adheres to the fabric, and then removing the sheet whereby the characters of said sheet remain on the compound.

5. The method of producing characters which consists in, passing a plastic compound through a coarse screen stencil onto the characters of a transfer sheet, then pressing a section of open mesh wire fabric into the compound before the same is dry so that said compound adheres to the fabric, and then removing the sheet whereby the characters of said sheet remain on the compound.

6. The method of producing characters which consists in, passing a plastic compound through a coarse screen stencil onto the characters of a transfer sheet, drying said compound, applying a chemical to said compound to restore it to a semi-plastic state, then pressing a section of open mesh wire fabric into the compound so that the same enters the interstices of the fabric and adheres thereto, and then removing the sheet, whereby the characters of said sheet are transferred to the surface of the compound on said fabric.

7. The method of producing characters which consists in, passing a plastic material through a silk screen stencil onto a sheet of decalcomania paper to form a transfer sheet, having characters thereon, passing a plastic compound through a stencil onto the characters of said sheet, then pressing a section of open mesh wire fabric into the compound so that said compound adheres to the fabric, and then removing the sheet whereby the characters of said sheet remain on the compound.

8. The method of producing characters which consists in, passing a plastic material through a coarse screen stencil onto an open mesh wire fabric to form a background, and then transferring characters from an ordinary transfer sheet onto the surface of the plastic compound background.

9. The method of producing a display on an open mesh wire fabric which consists in, providing a background of plastic material having a shape and color to form a part of a complete display, mounting said background on an open mesh wire fabric, and transferring contrasting characters from a transfer sheet onto said background to complete the display.

10. The method of producing a display on an open mesh wire fabric which consists in, passing a plastic compound onto a mesh wire fabric through a stencil to provide a background thereon which background forms a part of the complete display, and transferring characters from a transfer sheet onto said background to complete the display.

JOHN H. POLLARD.